(12) United States Patent
Toba et al.

(10) Patent No.: US 12,410,501 B2
(45) Date of Patent: Sep. 9, 2025

(54) HOT-DIP PLATED STEEL SHEET

(71) Applicant: NIPPON STEEL CORPORATION, Tokyo (JP)

(72) Inventors: Tetsuya Toba, Tokyo (JP); Yasuaki Kawamura, Tokyo (JP); Jun Nakagawa, Tokyo (JP); Shintaro Uemura, Tokyo (JP); Tomohito Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/848,434

(22) PCT Filed: Jun. 9, 2023

(86) PCT No.: PCT/JP2023/021565
§ 371 (c)(1),
(2) Date: Sep. 18, 2024

(87) PCT Pub. No.: WO2023/238938
PCT Pub. Date: Dec. 14, 2023

(65) Prior Publication Data
US 2025/0109473 A1 Apr. 3, 2025

(30) Foreign Application Priority Data
Jun. 10, 2022 (JP) .................. 2022-094362

(51) Int. Cl.
*C23C 2/00* (2006.01)
*B32B 15/01* (2006.01)
(Continued)

(52) U.S. Cl.
CPC .......... *C23C 2/0064* (2022.08); *B32B 15/013* (2013.01); *B32B 15/04* (2013.01);
(Continued)

(58) Field of Classification Search
CPC ....... C22C 18/04; C22C 18/00; C23C 2/0064; C23C 2/022; C23C 2/024; C23C 2/06;
(Continued)

(56) References Cited

U.S. PATENT DOCUMENTS

2012/0211124 A1 8/2012 Honda et al.
2014/0127531 A1 5/2014 Yasui et al.
(Continued)

FOREIGN PATENT DOCUMENTS

CN 102666903 A 9/2012
CN 112166206 A 1/2021
(Continued)

*Primary Examiner* — Michael E. La Villa
(74) *Attorney, Agent, or Firm* — Renner, Otto, Boisselle & Sklar, LLP

(57) ABSTRACT

A hot-dip plated steel sheet includes a hot-dip plated layer formed on a surface of a steel sheet, the hot-dip plated layer contains 4 to 22 mass % of Al and 1.0 to 10 mass % of Mg with a remainder including Zn and impurities. A pattern portion and a non-pattern portion are formed in the hot-dip plated layer. An element concentrated region containing an element M and an interface alloy layer containing Fe and Al are present at an interface between the steel sheet and the hot-dip plated layer in the pattern portion. An average concentration of the element M contained in the hot-dip plated layer present in the pattern portion and the element concentrated region is 0.0010 to 2 mass %. In the element concentrated region, the element M is concentrated two or more times the hot-dip plated layer present in the pattern portion, or the element M is unevenly distributed.

9 Claims, 1 Drawing Sheet

(51) Int. Cl.
*B32B 15/04* (2006.01)
*B32B 15/18* (2006.01)
*C22C 18/00* (2006.01)
*C22C 18/04* (2006.01)
*C23C 2/02* (2006.01)
*C23C 2/06* (2006.01)
*C23C 2/12* (2006.01)
*C23C 2/16* (2006.01)
*C23C 2/20* (2006.01)
*C23C 2/26* (2006.01)
*C23C 2/28* (2006.01)
*C23C 2/40* (2006.01)
*C23C 28/02* (2006.01)
*C23C 30/00* (2006.01)

(52) U.S. Cl.
CPC ............ *B32B 15/043* (2013.01); *B32B 15/18* (2013.01); *C22C 18/00* (2013.01); *C22C 18/04* (2013.01); *C23C 2/006* (2013.01); *C23C 2/02* (2013.01); *C23C 2/022* (2022.08); *C23C 2/024* (2022.08); *C23C 2/06* (2013.01); *C23C 2/12* (2013.01); *C23C 2/16* (2013.01); *C23C 2/20* (2013.01); *C23C 2/26* (2013.01); *C23C 2/28* (2013.01); *C23C 2/29* (2022.08); *C23C 2/40* (2013.01); *C23C 28/021* (2013.01); *C23C 28/023* (2013.01); *C23C 28/025* (2013.01); *C23C 30/00* (2013.01); *C23C 30/005* (2013.01); *Y10T 428/12757* (2015.01); *Y10T 428/12799* (2015.01); *Y10T 428/12958* (2015.01); *Y10T 428/12972* (2015.01); *Y10T 428/263* (2015.01); *Y10T 428/264* (2015.01); *Y10T 428/265* (2015.01); *Y10T 428/27* (2015.01)

(58) Field of Classification Search
CPC .... C23C 2/20; C23C 2/29; C23C 2/40; C23C 2/006; C23C 2/28; C23C 28/021; C23C 28/025; C23C 28/023; C23C 30/00; C23C 30/005; C23C 2/12; C23C 2/16; C23C 2/26; C23C 2/02; B32B 15/013; B32B 15/043; B32B 15/04; B32B 15/18; B32B 15/20; Y10T 428/12799; Y10T 428/12958; Y10T 428/12972; Y10T 428/12757; Y10T 428/27; Y10T 428/263; Y10T 428/264; Y10T 428/265
See application file for complete search history.

(56) References Cited

U.S. PATENT DOCUMENTS

| | | |
|---|---|---|
| 2014/0255724 A1 | 9/2014 | Yamanaka et al. |
| 2016/0024632 A1 | 1/2016 | Uranaka et al. |
| 2018/0371598 A1* | 12/2018 | Kim ................... C23C 28/02 |
| 2023/0019786 A1 | 1/2023 | Kim et al. |
| 2023/0323521 A1 | 10/2023 | Saito et al. |

FOREIGN PATENT DOCUMENTS

| | | |
|---|---|---|
| JP | 3600804 B | 12/2004 |
| JP | 5043234 B | 10/2012 |
| JP | 5141899 B | 2/2013 |
| JP | 2014-015675 A | 1/2014 |
| JP | 2014-208902 A | 11/2014 |
| SG | 11202011636 | 12/2020 |
| WO | 2013/002358 A1 | 1/2013 |
| WO | 2013/047812 A1 | 4/2013 |
| WO | 2019/230894 A1 | 12/2019 |
| WO | 2021/112519 A1 | 6/2021 |
| WO | 2022/085386 A1 | 4/2022 |

* cited by examiner

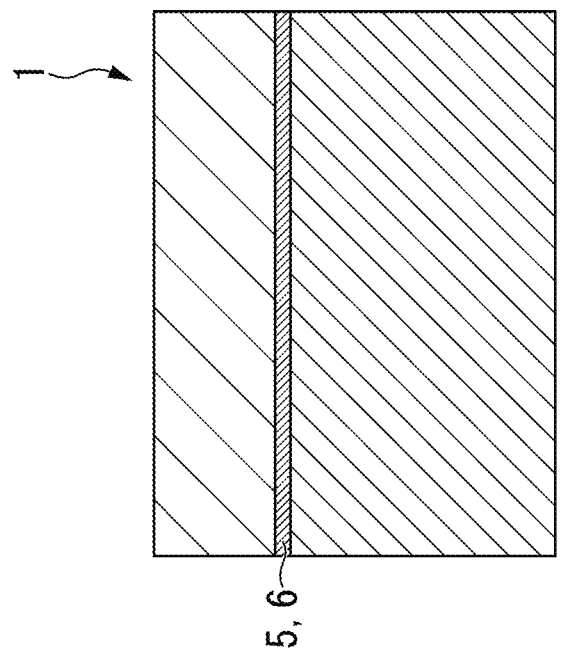
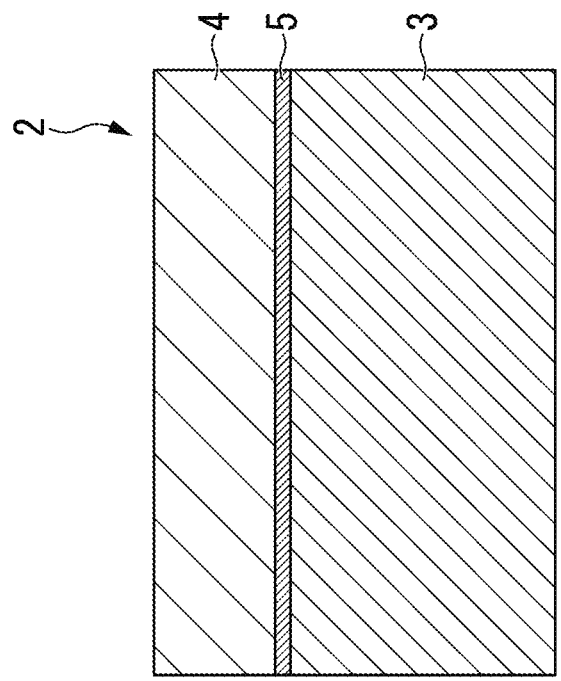

HOT-DIP PLATED STEEL SHEET

TECHNICAL FIELD

The present invention relates to a hot-dip plated steel sheet.

Priority is claimed on Japanese Patent Application No. 2022-094362, filed Jun. 10, 2022, the content of which is incorporated herein by reference.

BACKGROUND ART

A Zn—Al—Mg-based hot-dip plated steel sheet having higher corrosion resistance than a hot-dip galvanized steel sheet is widely used in various manufacturing industries such as building materials, home electric appliances, and automobile fields, and the use amount thereof has increased in recent years.

Incidentally, there is a case where characters, design drawings, and the like are displayed on a surface of a hot-dip plated layer of a hot-dip plated steel sheet by subjecting the hot-dip plated layer to a step such as printing or coating for the purpose of displaying characters, design drawings, and the like on the surface of the hot-dip plated layer.

However, when steps such as printing and coating are performed on the hot-dip plated layer, there is a problem in that the cost and time for applying characters, designs, and the like increase. Furthermore, when characters, designs, and the like are displayed on the surface of the plated layer by printing or coating, not only the metallic gloss external appearance favored by consumers is lost, but also durability is poor due to problems of degradation of the coating film itself with time and degradation of adhesion of the coating film with time, and characters, designs, and the like may disappear over time. Furthermore, when characters, designs, and the like are displayed on the surface of the plated layer by stamping the ink, cost and time are relatively suppressed, but corrosion resistance of the hot-dip plated layer may be reduced by the ink. Furthermore, when a design or the like is displayed by grinding the hot-dip plated layer, the durability of the design or the like is excellent, but since the thickness of the hot-dip plated layer at the grinding location is greatly reduced, corrosion resistance is necessarily reduced, and there is a concern that plating characteristics are deteriorated.

As shown in the following Patent Documents, various technical developments have been made in the field of Zn—Al—Mg-based hot-dip plated steel sheets, but there is no known technique for improving the durability when characters, designs, and the like are displayed on the surface of a plated layer.

Regarding Zn—Al—Mg-based hot-dip plated steel sheets, there are prior art techniques aimed at improving the satin-like plating appearance of these Zn—Al—Mg-based hot-dip plated steel sheets to make it more beautiful.

For example, Patent Document 1 describes a Zn—Al—Mg-based hot-dip plated steel sheet having a satin-like external appearance with fine texture and many smooth glossy portions, that is, a Zn—Al—Mg-based hot-dip plated steel sheet having a good satin-like external appearance in which the number of white portions per unit area is large and the ratio of the area of the glossy portions is large. In addition, Patent Document 1 describes that an unfavorable satin state is a state where a surface appearance in which indefinite white portions and circular glossy portions are mixed and scattered on the surface is exhibited.

In addition, Patent Document 2 describes a Zn—Al—Mg-based plated steel sheet in which, in a cross section of a plated layer in a thickness direction, a part where Al crystals are not present between an interface between the plated layer and a base metal and a plated surface layer occupies 10% to 50% of a length of the cross section in a width direction, thereby improving plating appearance.

Further, Patent Document 3 describes a hot-dip galvanized steel sheet having excellent formability, in which a center line average roughness Ra of a surface of the plated steel sheet is 0.5 to 1.5 μm, a PPI (the number of peaks having a size of 1.27 μm or more included per 1 inch (2.54 cm)) is 150 to 300, and Pc (the number of peaks having a size of 0.5 μm or more included per 1 cm) is Pc≥PPI/2.54+10.

Furthermore, Patent Document 4 describes a highly corrosion-resistant hot-dip galvanized steel sheet in which a ternary eutectic structure of $Al/MgZn_2/Zn$ is refined to increase glossiness of a plated layer as a whole and improve external appearance evenness.

However, a technique for improving the durability and preventing the corrosion resistance from being lowered when characters or the like are displayed on the surface of the plated layer is not conventionally known.

CITATION LIST

Patent Document

Patent Document 1: Japanese Patent No. 5043234
Patent Document 2: Japanese Patent No. 5141899
Patent Document 3: Japanese Patent No. 3600804
Patent Document 4: PCT International Publication No. WO 2013/002358

SUMMARY OF INVENTION

Technical Problem

The present invention has been made in view of the above circumstances, and an object of the present invention is to provide a hot-dip plated steel sheet in which characters, designs, and the like can be displayed on the surface of a hot-dip plated layer, which has excellent durability and corrosion resistance thereof, and which has excellent adhesion of the hot-dip plated layer at a part where the characters and the designs appear.

Solution to Problem

In order to solve the above problem, the present invention adopts the following configurations.

[1] A hot-dip plated steel sheet, including:
a steel sheet and a hot-dip plated layer formed on a surface of the steel sheet, wherein
the hot-dip plated layer, in terms of average composition, contains 4 to 22 mass % of Al and 1.0 to 10 mass % of Mg with a remainder including Zn and impurities,
the hot-dip plated layer includes a pattern portion and a non-pattern portion,
an element concentrated region containing one or more elements M of Sb, Pb, Sn, Ca, Co, Mn, P, B, Bi, Cr, Sc, Y, Ni, Ti, Zr, Mo, W, REM, Hf, and C, and an interface alloy layer containing Fe and Al are present at an interface between the steel sheet and the hot-dip plated layer in the pattern portion, an average concentration of the element M contained in the hot-dip plated layer present in the pattern portion and the element concentrated region is 0.0010 to 2 mass %, and in the element concentrated region, the element M is concentrated two or more times the hot-dip plated layer present in the pattern portion, or the element M is unevenly distributed.

[2] The hot-dip plated steel sheet described in [1], in which the interface alloy layer containing Fe and Al is present at an interface between the steel sheet of the non-pattern portion and the hot-dip plated layer.

[3] The hot-dip plated steel sheet described in [1] or [2], in which the concentration of the element M at the interface of the pattern portion is 1.5 times or more the concentration of the element M at the interface of the non-pattern portion.

[4] The hot-dip plated steel sheet described in any one of [1] to [3], in which the pattern portion is disposed to have a shape of any one of a straight line portion, a curve portion, a dot portion, a figure, a number, a symbol, and a character, or a combination of two or more thereof.

[5] The hot-dip plated steel sheet described in any one of [1] to [4], in which the hot-dip plated layer further, in terms of average composition, contains 0.0001 to 2 mass % of Si.

[6] The hot-dip plated steel sheet described in [5], in which the interface alloy layer formed in the pattern portion further contains Si.

[7] The hot-dip plated steel sheet described in [5] or [6], in which the interface alloy layer formed in the non-pattern portion further contains Si.

[8] The hot-dip plated steel sheet described in any one of any one of [1] to [7], in which the hot-dip plated layer excluding the element concentrated region, in terms of average composition, further contains 0.0001 to 1 mass % in total of any one or more of Ni, Ti, Zr, Sr, Fe, Sb, Pb, Sn, Ca, Co, Mn, P, B, Bi, Cr, Sc, Y, REM, Hf, and C.

[9] The hot-dip plated steel sheet described in any one of [1] to [8], in which an adhesion amount of the hot-dip plated layer is 30 to 600 g/m$^2$ in total on both surfaces of the steel sheet.

Advantageous Effects of Invention

According to the present invention, it is possible to provide a hot-dip plated steel sheet in which characters, designs, and the like can be displayed on the surface of a hot-dip plated layer, which has excellent durability and corrosion resistance thereof, and which has excellent adhesion of the hot-dip plated layer at a part where the characters and the designs appear.

BRIEF DESCRIPTION OF DRAWINGS

FIG. 1 is a schematic cross-sectional view explaining a pattern portion and a non-pattern portion of a hot-dip plated steel sheet according to an embodiment of the present invention.

DESCRIPTION OF EMBODIMENTS

A hot-dip plated steel sheet according to an embodiment of the present invention will be described.

The hot-dip plated steel sheet of the present embodiment includes a steel sheet and a hot-dip plated layer formed on a surface of the steel sheet.

The hot-dip plated layer, in terms of average composition, contains 4 to 22 mass % of Al and 1.0 to 10 mass % of Mg with a remainder including Zn and impurities.

A pattern portion and a non-pattern portion are formed on the hot-dip plated layer.

The element concentrated region and the interface alloy layer are present at the interface between the steel sheet of the pattern portion and the hot-dip plated layer.

The interface alloy layer is present at the interface between the steel sheet of the non-pattern portion and the hot-dip plated layer.

The pattern portion is disposed to have a shape of any one of a straight line portion, a curve portion, a dot portion, a figure, a number, a symbol, and a character, or a combination of two or more thereof.

The pattern portion is intentionally formed.

The material of the steel sheet as a base of the hot-dip plated layer is not particularly limited. Although details will be described later, general steel or the like can be used as a material without particular limitation, Al-killed steel or some high alloy steel can also be applied, and the shape is also not particularly limited. The hot-dip plated layer according to the present embodiment is formed by applying a hot-dip plating method described later to the steel sheet.

Next, the chemical composition of the hot-dip plated layer will be described.

The hot-dip plated layer, in terms of average composition, contains 4 to 22 mass % of Al and 1.0 to 10 mass % of Mg, with the remainder including Zn and impurities. More preferably, the hot-dip plated layer, in terms of average composition, contains 4 to 22 mass % of Al and 1.0 to 10 mass % of Mg, with the remainder consisting of Zn and impurities. The hot-dip plated layer may contain 0.0001 to 2 mass % of Si in terms of average composition. Furthermore, the hot-dip plated layer, in terms of average composition, may contain any one or more of Ni, Ti, Zr, Sr, Fc, Sb, Pb, Sn, Ca, Co, Mn, P, B, Bi, Cr, Sc, Y, REM, Hf, and C in an amount of 0.0001 to 1 mass % in total.

The content of Al is in the range of 4 to 22 mass % in terms of average composition. Al may be contained in order to ensure corrosion resistance. When the content of Al in the hot-dip plated layer is 4 mass % or more, the effect of improving corrosion resistance is further enhanced. When the content is more than 22 mass %, the effect of improving corrosion resistance is saturated. From the viewpoint of corrosion resistance, the lower limit is preferably 5 mass %, more preferably 6 mass %. The upper limit is preferably 18 mass %, more preferably 16 mass %.

The content of Mg is in the range of 1.0 to 10 mass % in terms of average composition. Mg may be contained in order to improve corrosion resistance. When the content of Mg in the hot-dip plated layer is 1.0 mass % or more, the effect of improving corrosion resistance is further enhanced. However, when Mg exceeds 10 mass %, dross is generated significantly in the plating bath, and it becomes difficult to stably manufacture a hot-dip plated steel sheet, and thus the content of Mg is set to 10 mass % or less. From the viewpoint of the balance between corrosion resistance and dross generation, the lower limit of the content of Mg is preferably 1.5 mass %, more preferably 2.0 mass %. The upper limit is preferably 6.0 mass %, more preferably 5.0 mass %.

The hot-dip plated layer may contain 0.0001 to 2 mass % of Si in terms of average composition. Si is an element effective for improving adhesion of the hot-dip plated layer. When Si is contained in an amount of 0.0001 mass % or more in the hot-dip plated layer, an effect of improving adhesion is exhibited, and therefore Si is preferably contained in an amount of 0.0001 mass % or more. On the other hand, even when Si is contained in an amount exceeding 2 mass %, the effect of improving plating adhesion is saturated. Therefore, even when Si is contained in the hot-dip plated layer, the content of Si is set to 2 mass % or less. From the viewpoint of plating adhesion, the lower limit value of the content of Si in the hot-dip plated layer may be 0.0010 or 0.0100 mass %. The upper limit may be 1.0 mass % or 0.8 mass %.

The hot-dip plated layer may contain, in terms of average composition, 0.0001 to 1 mass % in total of one or more of Ni, Ti, Zr, Sr, Fe, Sb, Pb, Sn, Ca, Co, Mn, P, B, Bi, Cr, Sc, Y, REM, Hf, and C. By containing these elements, the corrosion resistance of the hot-dip plated layer can be further improved. REM is one or more of rare earth elements of atomic number 57 to 71 in the periodic table. These elements may be contained in the hot-dip plated layer by being added to the hot-dip plating bath, or may be contained in the hot-dip plated layer by being diffused from the solidification nucleus. However, in the present embodiment, in the plated layer excluding the element concentrated region, the above elements may be in the range of 0.0001 to 1 mass % in total.

The remainder of the chemical composition of the hot-dip plated layer are zinc and impurities. Examples of impurities include impurities inevitably contained in base metals such as zinc, and impurities contained when steel is melted in a plating bath.

The average composition of the hot-dip plated layer can be measured by the following method. First, the surface layer coating film is removed with a coating film peeling agent (for example, NEOREVER SP-751 manufactured by Sansai Kako Co. Ltd.) that does not erode plating, then the hot-dip plated layer is melted with hydrochloric acid containing an inhibitor (for example, HIBIRON manufactured by Sugimura Chemical Industry Co., Ltd.), and the obtained solution is subjected to inductively coupled plasma (ICP) emission spectrometry, whereby the surface layer coating film can be obtained. In addition, when there is no surface layer coating film, the work of removing the surface layer coating film can be omitted.

Next, the microstructure of the hot-dip plated layer will be described. The microstructure of the hot-dip plated layer of the present embodiment may have, for example, the following microstructure. As a result, the external appearance of the surface of the hot-dip plated layer becomes a satin-like external appearance, and has excellent aesthetic appearance. Since the microstructure of the hot-dip plated layer can be obtained if the plating has the above chemical composition, it is not necessary to limit the microstructure of the hot-dip plated layer in the present invention.

The hot-dip plated layer containing Al, Mg, and Zn contains the [Al phase] and the [Al/Zn/MgZn$_2$ ternary eutectic structure]. Specifically, the [Al phase] is included in the base material of [Al/Zn/MgZn$_2$ ternary eutectic structure]. Further, the base material of the [Al/Zn/MgZn$_2$ ternary eutectic structure] may include the [MgZn$_2$ phase] or the [Zn phase]. When Si is contained, the [Mg$_2$Si phase] may be contained in the base material of [Al/Zn/MgZn$_2$ ternary eutectic structure].

[Al/Zn/MgZn$_2$ Ternary Eutectic Structure]

The [Al/Zn/MgZn$_2$ ternary eutectic structure] is a ternary eutectic structure of an Al phase, a Zn phase, and an intermetallic compound MgZn$_2$ phase, and the Al phase forming the ternary eutectic structure corresponds to, for example, an "Al" phase" (Al solid solution containing Zn as a solid solution, containing a small amount of Mg) at a high temperature in a ternary system equilibrium state diagram of Al—Zn—Mg.

The Al" phase at a high temperature is usually displayed as a fine Al phase and a fine Zn phase are separated at room temperature. The Zn phase in the ternary eutectic structure is a Zn solid solution in which a small amount of Al is solid-solved, and in some cases, a further small amount of Mg is solid-solved. The MgZn$_2$ phase in the ternary eutectic structure is an intermetallic compound phase present in the vicinity of Zn: approximately 84 mass % in the binary equilibrium state diagram of Zn—Mg.

As far as can be seen from the phase diagram, other additive elements are not solid-solved in this phase, or even when other additive elements are solid-solved, the amount thereof is considered to be extremely small. However, since the amount thereof cannot be clearly distinguished by ordinary analysis, the ternary eutectic structure consisting of these three phases is referred to as [Al/Zn/MgZn$_2$ ternary eutectic structure] in the present specification.

[Al Phase]

The [Al phase] is a phase that looks like an island with a clear boundary in the base material of the [Al/Zn/MgZn$_2$ ternary eutectic structure], and this corresponds to, for example, an Al" phase (Al solid solution containing Zn as a solid solution, containing a small amount of Mg) at a high temperature in the ternary system equilibrium state diagram of Al—Zn—Mg. The Al" phase at a high temperature has a difference in the amount of Zn or Mg to be solid-solved depending on the Al or Mg concentrations of the plating bath. The Al" phase at a high temperature is usually separated into a fine Al phase and a fine Zn phase at room temperature, but the island-like shape seen at room temperature is considered to be caused by the shape of the Al" phase at a high temperature.

As far as can be seen from the phase diagram, other additive elements are not solid-solved in this phase, or even when the additive elements are solid-solved, the amount thereof is considered to be extremely small. However, since it cannot be clearly distinguished by normal analysis, a phase derived from the Al" phase at a high temperature and resulting from the shape of the Al" phase is referred to as [Al phase] in the present specification.

The [Al phase] can be clearly distinguished from the Al phase forming the [Al/Zn/MgZn$_2$ ternary eutectic structure] under microscopic observation.

[Zn Phase]

The [Zn phase] is a phase that looks like an island with a clear boundary in the base material of the [Al/Zn/MgZn$_2$ ternary eutectic structure], and actually, a small amount of Al or a small amount of Mg may be solid-solved. As far as can be seen from the phase diagram, other additive elements are not solid-solved in this phase, or even when other additive elements are solid-solved, the amount thereof is considered to be extremely small.

The [Zn phase] can be clearly distinguished from the Zn phase forming the [Al/Zn/MgZn$_2$ ternary eutectic structure] under microscopic observation. The hot-dip plated layer according to the present embodiment may contain a [Zn phase] depending on manufacturing conditions, but the influence of the [Zn phase] on corrosion resistance is hardly observed. Therefore, even when the [Zn phase] is contained in the hot-dip plated layer, there is no particular problem.

[MgZn$_2$ Phase]

The [MgZn$_2$ phase] is a phase that looks like an island with a clear boundary in the base material of the [Al/Zn/MgZn$_2$ ternary eutectic structure], and actually, a small amount of Al may be solid-solved. As far as can be seen from the phase diagram, other additive elements are not solid-solved in this phase, or even when other additive elements are solid-solved, the amount thereof is considered to be extremely small.

The [$MgZn_2$ phase] and the $MgZn_2$ phase forming the [$Al/Zn/MgZn_2$ ternary eutectic structure] can be clearly distinguished from each other under microscopic observation. The hot-dip plated layer of the present embodiment may not contain the [$MgZn_2$ phase] depending on the manufacturing conditions, but the [$MgZn_2$ phase] is contained in the hot-dip plated layer under most manufacturing conditions.

[$Mg_2Si$ Phase]

The [$Mg_2Si$ phase] is a phase that looks like an island with a clear boundary in the solidified structure of the plated layer when Si is added. As far as can be seen from the phase diagram, Zn, Al, and other additive elements are not solid-solved in the [$Mg_2Si$ phase], or even when Zn, Al, and other additive elements are solid-solved, the amount thereof is considered to be extremely small. The [$Mg_2Si$ phase] can be clearly distinguished from other phases in the hot-dip plated layer under microscopic observation.

The hot-dip plated layer of the present embodiment is formed by immersing the steel sheet in a plating bath, then pulling up the steel sheet, and then solidifying the molten metal adhering to the sheet surface. At this time, the [Al phase] is first formed, and then the [$Al/Zn/MgZn_2$ ternary eutectic structure] is formed as the temperature of the molten metal decreases. Depending on the chemical composition (that is, the chemical components of the plating bath) of the hot-dip plated layer, [$Mg_2Si$ phase], [$MgZn_2$ phase], or [Zn phase] may be formed in the base material of [$Al/Zn/MgZn_2$ ternary eutectic structure].

Next, the pattern portion and the non-pattern portion of the hot-dip plated layer will be described.

On the surface of the hot-dip plated layer of the present embodiment, a pattern portion and a non-pattern portion disposed to have a predetermined shape are formed. From the viewpoint of ensuring the aesthetic appearance of the pattern portion, the pattern portion is preferably disposed to have a predetermined shape. From the viewpoint of ensuring the visibility of the pattern portion, the size of the pattern portion is preferably as large as possible. For example, the pattern portion preferably has an artificial shape. The pattern portion is preferably disposed in an intentional shape. The pattern portion is preferably disposed to have a shape of any one of a straight line portion, a curve portion, a dot portion, a figure, a number, a symbol, and a character, or a combination of two or more thereof. For example, a character string, a numeric string, a symbol, a mark, a diagram, a design drawing, a combination thereof, or the like including a pattern portion appears on the surface of the hot-dip plated layer. Each of the straight line portion and the curve portion in the pattern portion preferably has a length of 1 mm or more. By showing these shapes, it can be said that the pattern portion is intentionally formed. The straight line portion and the curve portion in the pattern portion preferably have a width that can be visually recognized as described later, and each has a length of 1 mm or more. The dot portion in the pattern portion preferably has a circle equivalent diameter of 1 mm or more and less than 10 mm, and more preferably, a plurality of dot portions are regularly arranged. When the pattern portion is a figure, a number, a symbol, or a character, it is preferable that these shapes can be visually recognized as described later. By showing such dimensions and shapes, it can be said that the pattern portion is formed more intentionally. The non-pattern portion is a region other than the pattern portion. In addition, the shape of the pattern portion is allowed as long as the pattern portion can be recognized as a whole even when a part of the pattern portion is missing. The non-pattern portion may have a shape that borders a boundary of the pattern portion.

When any one of a straight line portion, a curve portion, a dot portion, a figure, a number, a symbol, and a character, or a combination of two or more of these shapes are disposed on the surface of the hot-dip plated layer, these regions can be used as pattern portions, and the other regions can be used as non-pattern portions. This shape is a shape intentionally or artificially formed by a manufacturing method to be described later, and is not formed naturally. A person skilled in the art who knows the external appearance of an ordinary hot-dip plated layer can easily distinguish between a pattern portion having an artificial shape and a non-pattern portion.

The pattern portion may be formed in such a size that the presence of the pattern portion can be determined by visual recognition with the naked eye or by visual recognition using a magnifying glass or a microscope. The non-pattern portion is a region occupying most of the hot-dip plated layer (surface of the hot-dip plated layer), and the pattern portion is disposed in a predetermined shape in the non-pattern portion. Specifically, in the non-pattern portion, the pattern portion is disposed to have a shape of any one of a straight line portion, a curve portion, a figure, a dot portion, a figure, a number, a symbol, and a character, or a combination of two or more thereof. By intentionally adjusting the shape of the pattern portion, any one of a straight line portion, a curve portion, a figure, a dot portion, a figure, a number, a symbol, and a character, or a combination of two or more thereof, appears on the surface of the hot-dip plated layer. For example, a character string, a numeric string, a symbol, a mark, a diagram, a design drawing, a combination thereof, or the like including a pattern portion appears on the surface of the hot-dip plated layer. This shape is a shape intentionally or artificially formed by a manufacturing method to be described later, and is not formed naturally. A person skilled in the art who knows the external appearance of an ordinary hot-dip plated layer can easily distinguish between a pattern portion having an artificial shape and a non-pattern portion. In particular, a region having a size capable of including a square of at least 1 mm on one side (this size may be smaller or larger than 1 mm) and having an artificial shape can be easily identified as a pattern portion.

From the viewpoint of improving the visibility of the pattern portion, the area fraction of the pattern portion on the surface of the hot-dip plated layer is preferably significantly smaller than that of the non-pattern portion. For example, the area fraction of the pattern portion on the surface of the hot-dip plated layer is preferably 30% or less, 25% or less, 20% or less, or 15% or less.

The pattern portion is a region having a high metallic gloss on the surface thereof. In addition, the non-pattern portion is a region having a low metallic gloss on the surface thereof and showing white or gray, and is a region showing a pear-skin external appearance seen in the Zn—Al—Mg-based hot-dip plated steel sheet. Therefore, the pattern portion and the non-pattern portion can be identified with the naked eye.

Furthermore, the pattern portion and the non-pattern portion may be identifiable under a microscope. Specifically, the shape constituted by the pattern portion may be any shape as long as the shape can be identified in a visual field of 50 times or less. In the visual field of 50 times or less, the pattern portion and the non-pattern portion can be identified by the difference in the surface state.

The pattern portion and the non-pattern portion can be identified at preferably 20 times or less, more preferably 10 times or less, and more preferably 5 times or less.

The pattern portion and the non-pattern portion may further satisfy any one of the following (a), (b), and (c).

(a) The pattern portion is a region where the exposure proportion of the [Al phase] on the surface of the hot-dip plated layer is 30 area % or less, and the non-pattern portion is a region where the exposure proportion of the [Al phase] on the surface of the hot-dip plated layer is more than 30 area %.

(b) The pattern portion is a region having an arithmetic mean surface roughness Sa of 1.0 μm or less, and the non-pattern portion is a region having an arithmetic mean surface roughness Sa of more than 1.0 μm.

(c) The relationship between the reflected light of the pattern portion in the normal direction and the reflected light of the non-pattern portion in the normal direction with respect to the incident light having an incident angle in a range of 0° to less than 90° with respect to the normal direction of the sheet surface satisfies the following formulas (1) and (2).

$$|I_{PH} - I_{BH}|/I_{PM} - I_{BM} < 1.0 \quad (1)$$

$$|I_{PL} - I_{BL}|/I_{PM} - I_{BM} < 1.0 \quad (2)$$

In the formulas (1) and (2), $I_{PH}$ is the reflection intensity of the pattern portion in the normal direction with respect to the incident light having an incident angle of 0° to less than 35°, $I_{BH}$ is the reflection intensity of the non-pattern portion in the normal direction with respect to the incident light having an incident angle of 0° to less than 35°, $I_{PM}$ is the reflection intensity of the pattern portion in the normal direction with respect to the incident light having an incident angle of 35° to 80°, $I_{BM}$ is the reflection intensity of the non-pattern portion in the normal direction with respect to the incident light having an incident angle of 35° to 80°, $I_{PL}$ is the reflection intensity of the pattern portion in the normal direction with respect to the incident light having an incident angle of more than 80° to less than 90°, and $I_{BL}$ is the reflection intensity of the non-pattern portion in the normal direction with respect to the incident light having an incident angle of more than 80° to less than 90°.

The hot-dip plated layer has at least the [Al phase] and the [Al/Zn/MgZn$_2$ ternary eutectic structure]. In the pattern portion, the [Al phase] is unevenly distributed on the steel sheet side in the thickness direction of the hot-dip plated layer. On the other hand, on the surface side in the thickness direction, the [Al phase] is relatively small, and a large number of microstructures or phases other than the [Al phase] are present. Therefore, in the pattern portion, the exposure proportion of the [Al phase] on the surface of the hot-dip plating phase is 30 area % or less.

The surface of the pattern portion has a relatively large number of [Al/Zn/MgZn$_2$ ternary eutectic structure], but the [Al/Zn/MgZn$_2$ ternary eutectic structure] forms a relatively flat surface during solidification of the hot-dip plated layer, and thus the arithmetic mean surface roughness Sa of the pattern portion is in the range of 1.0 μm or less.

As described above, in the pattern portion, the exposure proportion of the [Al phase] is 30 area % or less, or the arithmetic mean surface roughness Sa is relatively small at 1.0 μm or less, and thus it is presumed that metallic gloss is exhibited.

On the other hand, the hot-dip plated layer has at least the [Al phase] and the [Al/Zn/MgZn$_2$ ternary eutectic structure], but in the non-pattern portion, the [Al phase] is not unevenly distributed to the steel sheet side in the thickness direction of the hot-dip plated layer, and is relatively widely distributed in the entire thickness direction. Therefore, in the non-pattern portion, the exposure proportion of the [Al phase] on the surface of the hot-dip plating phase is more than 30 area %.

As described above, in the non-pattern portion, the exposed area of the [Al phase] is larger than that in the first region. The [Al phase] is a phase formed at an initial stage when the hot-dip plated layer is solidified, and crystallizes in a dendrite shape. Since a relatively large amount of [Al phase] crystallized in a dendrite shape is present on the surface of the hot-dip plated layer, the arithmetic mean surface roughness Sa of the non-pattern portion is in the range of more than 1.0 μm.

As described above, in the non-pattern portion, the exposure proportion of the [Al phase] is more than 30 area %, or the arithmetic mean surface roughness Sa is more than 1.0 μm, which is relatively large. Therefore, it is presumed that the light incident on the non-pattern portion is diffusely reflected, and exhibits white or gray.

The exposure proportion of the [Al phase] is measured by the following method. First, the surface of the hot-dip plated layer is photographed with a scanning electron microscope at a magnification of 100, and surface analysis is performed in which element distribution is measured with an energy dispersive X-ray elemental analyzer (EDS) attached to the scanning electron microscope. For example, five images of 1 mm$^2$ visual field in which the pattern portion was photographed and five images of 1 mm$^2$ visual field in which the non-pattern portion was photographed were prepared. For each image, the area of the [Al phase] exposed on the surface of the hot-dip plated layer was measured using commercially available image analysis software. The [Al phase] can be obtained by using both the Al-concentrated region in the surface analysis and the morphology observation of the [Al phase] by the reflected electron image. The [Al phase] is often present in a dendrite form. In each of the pattern portion and the non-pattern portion, the average value of the exposed areas of the [Al phase] in five images was obtained. Then, by dividing the average value of the exposed area of the [Al phase] by the total area of the observed visual field, the average exposed area fraction (%) of the [Al phase] in the observed visual field was obtained for each of the pattern portion and the non-pattern portion. The average exposed area fraction (%) of the [Al phase] obtained in this manner was taken as the exposure proportion of the [Al phase]. Note that, for example, the photographed visual field may be set to a size smaller than 1 mm$^2$ visual field for evaluation. In the case of a visual field smaller than 1 mm$^2$, the area may be 5 mm$^2$ in total.

The arithmetic mean surface roughness Sa is measured by the following method. The height Z is measured at a measurement interval of 50 μm in a state where a standard lens of 20 times is adhered, using a 3D laser microscope (manufactured by Keyence Corporation). It is preferable to set 100 measurement points preferably obtained from 10 points in the vertical direction×10 points in the horizontal direction. When the number of measurement points is set to 100 and the obtained height Z100 points are set to the height Z1 to the height Z100, Sa is calculated using the following equation. Zave is an average of 100 points of height Z.
Sa=$\frac{1}{100}\times\Sigma[x=1\rightarrow 100]$ (|height Zx−Zave|)

The [Al phase] generated during solidification of the hot-dip plated layer is usually crystallized in the entire thickness direction of the hot-dip plated layer. However, when a substance serving as a solidification nucleus is disposed on the sheet surface in advance, and when the molten metal adhered to the sheet surface is solidified in the region where the solidification nucleus is disposed, a large number of [Al phase] crystallizes using the solidification nucleus on the sheet surface as a nucleus. The generated [Al phase] is formed on a side relatively close to the steel sheet. In addition, since the [Al phase] is generated at a relatively high density in the region where the solidification nuclei exist, the [Al phase] itself does not coarsen and remains fine. Therefore, in the region where the solidification nucleus is disposed, the [Al phase] does not grow to the surface side of the hot-dip plated layer, and the exposure proportion of the [Al phase] decreases.

As described above, the region where the solidification nuclei exist on the sheet surface is likely to be the above-described pattern portion of the hot-dip plated layer, and the region where the solidification nuclei do not exist is less likely to be the non-pattern portion of the hot-dip plated layer. In addition, since the pattern portion is formed by the mechanism as described above, an element concentrated region derived from the solidification nucleus exists at the interface between the base steel sheet and the hot-dip plated layer of the pattern portion. More specifically, an element concentrated region containing one or more elements M of Sb, Pb, Sn, Ca, Co, Mn, P, B, Bi, Cr, Sc, Y, Ni, C, Ti, Zr, Mo, W, REM, Hf, and C is present at the interface between the steel sheet and the hot-dip plated layer in the pattern portion.

The element concentrated region is a region in which the element M is concentrated two times or more or the element M is unevenly distributed with respect to the hot-dip plated layer present in the pattern portion. Here, the fact that the element M is unevenly distributed refers to a state where the element M derived from the solidification nucleus is present in the element concentrated region, and the element M is not detected from a pattern portion other than the element concentrated region.

In the formation process of the hot-dip plated layer, some solidification nuclei may be diffused into the hot-dip plated layer. When such diffusion occurs, the element M constituting the solidification nucleus is also included in the hot-dip plated layer. In this case, the element M contained in the element concentrated region has a concentration two times or more the concentration of the element M contained in the hot-dip plated layer.

On the other hand, in the process of forming a hot-dip plated layer, solidification nuclei may hardly diffuse into the hot-dip plated layer. In this case, the element M constituting the solidification nucleus is not contained in the hot-dip plated layer, but is contained only in the element concentrated region. That is, the element concentrated region is a region where the element M is unevenly distributed with respect to the hot-dip plated layer of the pattern portion.

The element M contained in the element concentrated region has a concentration two times or more the concentration of the element M contained in the hot-dip plated layer. When the concentration of the element M contained in the element concentrated region is less than two times the concentration of the hot-dip plated layer of the pattern portion, the function of the solidification nucleus is not exhibited, and it becomes difficult to form the pattern portion.

The average concentration of the element M contained in the hot-dip plated layer and the element concentrated region of the pattern portion is 0.0010 to 2 mass %. When the average concentration is less than 0.0010 mass %, the function of the solidification nucleus is not exhibited, and it becomes difficult to form the pattern portion. On the other hand, when the average concentration exceeds 2 mass %, the shape performance of the pattern portion is sufficient, but the adhesion between the hot-dip plated layer and the steel sheet in the pattern portion is deteriorated due to the excessive presence of solidification nuclei, and the hot-dip plated layer in the pattern portion may be peeled off. Therefore, the average concentration of the element M contained in the hot-dip plated layer and the element concentrated region of the pattern portion may be in the range of 0.0010 to 2 mass %. The lower limit is preferably 0.1 mass %, and the upper limit is preferably 1.00 mass %.

On the other hand, since the non-pattern portion is a region where no solidification nucleus is present, the element M is hardly present (that is, not more than the detection limit) at the interface between the steel sheet of the non-pattern portion and the hot-dip plated layer, or even when the element M is present, the amount of element M is extremely small. Therefore, the concentration of the element M at the interface of the pattern portion, that is, the concentration of the element M in the element concentrated region is at least 1.5 times or more the concentration of the element M at the interface of the non-pattern portion. The concentration of the element M is preferably 2 times or more, more preferably 4 times or more. In addition, when the element M is equal to or less than the detection limit at the interface between the steel sheet of the non-pattern portion and the hot-dip plated layer, the magnification of the concentration of the element M cannot be calculated.

In order to confirm the presence and concentration ratio of the above-described elements at the interface between the steel sheet and the hot-dip plated layer in the pattern portion and the non-pattern portion, confirmation can be performed by exposing the cross section of the hot-dip plated steel sheet in the sheet thickness direction, and by performing surface analysis for measuring the element distribution at the interface between the hot-dip plated layer and the steel sheet appearing in the cross section using an electron beam probe microanalyzer (EPMA). In addition, regarding the presence of the interface alloy layer described later, the presence of the interface alloy layer can be confirmed by the same method. The thickness of the interface alloy layer can be confirmed by observing a reflected electron image of a scanning electron microscope (SEM).

As described above, before the steel sheet is immersed in the hot-dip plating bath, the solidification nucleus is disposed on the sheet surface in the shape of any one of the straight line portion, the curve portion, the figure, the number, the symbol, and the character, or a combination of two or more thereof, whereby the pattern portion having these shapes can be formed in the hot-dip plated layer.

Next, the interface alloy layer will be described. In the hot-dip plated steel sheet of the present embodiment, an interface alloy layer exists between the hot-dip plated layer and the steel sheet. The interface alloy layer is present in both the formation region of the pattern portion and the formation region of the non-pattern portion. The element concentrated region and the interface alloy layer exist at the interface between the hot-dip plated layer and the steel sheet in the pattern portion. In the hot-dip plated steel sheet of the present embodiment, the interface alloy layer is also formed in the pattern portion having the element concentrated region, and accordingly, the adhesion of the hot-dip plated layer in the pattern portion is equivalent to the adhesion of the hot-dip plated layer in the non-pattern portion. Accordingly, there is no possibility that the pattern portion of the hot-dip plated layer is peeled off, and corrosion resistance of the hot-dip plated steel sheet is improved over the entire surface of the hot-dip plated layer.

The interface alloy layer contains at least Fe and Al. When the hot-dip plated layer contains Si, the interface alloy layer contains at least Fe, Si, and Al.

The interface alloy layer is formed on the surface of the base steel sheet (specifically, a space between the base steel sheet and the hot-dip plated layer is provided), and the $Al_5Fe_2$ phase is a layer of the main phase as a microstructure. In general, the interface alloy layer is formed by mutual atomic diffusion of a base metal (steel sheet) and a plating bath. When a hot-dip plating method is used as a manufacturing method, an interface alloy layer containing Fe and Al is easily formed on the Al-containing hot-dip plated layer. Since a certain concentration or more of Al is contained in the plating bath, the $Al_5Fe_2$ phase is formed most. However, the atomic diffusion takes time, and there is a part where the Fe concentration is high in a part close to the base metal. Therefore, a small amount of an AlFe phase, an Al Fe phase, or the like may be partially contained in the interface alloy layer. In addition, since a certain concentration of Zn is also contained in the plating bath, a small amount of Zn is also contained in the Al—Fe-based alloy phase.

When Si is contained in the hot-dip plated layer, Si is easily incorporated into the interface alloy layer, and may be solid-solved in the Al—Fe-based alloy phase or an Al—Fe—Si intermetallic compound phase may be formed. Examples of the Al—Fe—Si-based intermetallic compound phase include α, β, q1, and q2 phases. Therefore, these Al—Fe—Si-based intermetallic compound phases and the like may be detected in the interface alloy layer.

In the present embodiment, the solidification nucleus is not disposed on the sheet surface in the region where the non-pattern portion is to be formed. Therefore, in the non-pattern portion, mutual atomic diffusion between the base metal (base steel sheet) and the plating bath easily proceeds, and the interface alloy layer is easily formed. On the other hand, since the solidification nucleus is disposed on the sheet surface in the region where the pattern portion is to be formed, in the pattern portion, atomic diffusion between the base metal (base steel sheet) and the plating bath does not proceed, and the interface alloy layer is not formed at all, or even when the interface alloy layer is formed, the thickness thereof is extremely thin to such an extent that the thickness thereof is not detected. Therefore, in the present embodiment, in order to promote the growth of the interface alloy layer particularly in the pattern portion, it is necessary to perform the reheating treatment after the hot-dip plating step.

The thickness of the interface alloy layer is preferably in the range of 10 to 500 nm and more preferably in the range of 10 to 100 nm in each of the pattern portion and the non-pattern portion. Accordingly, the adhesion between the pattern portion and the non-pattern portion can be further enhanced.

FIG. 1 is a schematic cross-sectional view of a pattern portion 1 and a non-pattern portion 2. In the non-pattern portion 2, an interface alloy layer 5 exists between a steel sheet 3 and a plated layer 4. In the pattern portion 1, the interface alloy layer 5 and an element concentrated region 6 exist between the steel sheet 3 and the plated layer 4. In the pattern portion 1, it is considered that the element concentrated region 6 exists in the interface alloy layer 5 in an independent state without being solid-solved. However, since each of them has a fine structure, it is difficult to make a determination even by cross-sectional analysis such as EPMA. In the element mapping of the cross section by EPMA or the like, an element mapping image is obtained as if the interface alloy layer 5 and the element concentrated region 6 exist at the same location.

The hot-dip plated steel sheet according to the present embodiment may have a chemical treatment layer or a coating film layer on the surface of the hot-dip plated layer. Here, the types of chemical treatment layer and coating film layer are not particularly limited, and known chemical treatment layers and coating film layers can be used.

As an example of the chemical conversion coating, a chemical conversion coating containing a phthalocyanine pigment coated with at least one of a resin and a surfactant can be exemplified. The hot-dip plated layer provided with the chemical conversion coating can impart a preferable designability to the surface of the plated layer by being colored with a phthalocyanine pigment, and the visibility of the pattern portion is further enhanced. Furthermore, corrosion resistance, weather resistance, and the like of the chemical conversion coating can be improved.

Next, a method for manufacturing a Zn—Al—Mg-based hot-dip plated steel sheet of the present embodiment will be described.

First, a hot-rolled steel sheet is manufactured, and hot-band annealing is performed as necessary. After pickling, cold rolling is performed to obtain a cold band. The cold band is degreased and washed with water, and then annealed (cold-band annealing), and the annealed cold band is immersed in a hot-dip plating bath to form a hot-dip plated layer.

Here, during a period from cold rolling to immersion in a hot-dip plating bath, a solidification nucleus is adhered to the sheet surface to form a pattern portion having a shape of any one of a straight line portion, a curve portion, a figure, a number, a symbol, and a character, or a combination of two or more thereof. The adhesion of the solidification nucleus is carried out at any stage between the cold rolling and the cold-band annealing, between the cold-band annealing and the immersion in the hot-dip plating bath, or immediately before the final annealing of the cold-band annealing. The solidification nucleus may be adhered in a state of solution dispersion or may be adhered by vapor deposition.

The component (hereinafter, may be referred to as a solidification nucleation component) that forms solidification nuclei is not particularly limited as long as the component is one that forms solidification nuclei in the process of solidifying the plated layer. Examples of the solidification nucleation component include a compound containing any one or more of Sb, Pb, Sn, Ca, Co, Mn, P, B, Bi, Cr, Sc, Y, Ni, Ti, Zr, Mo, W, REM, Hf, and C, or any one or more of the above-described elements. One or more of the above components may be used in combination. Examples of the method for adhering the solidification nucleus to the sheet surface include a method in which a solidification nucleation component is contained in an alloy foil, a resin, a surfactant, an ink, an oil, or the like and adhered to the sheet surface in addition to the solidification nucleation component itself. These solidification nucleation components may be solids themselves, or may be melted or dispersed in water or an organic solvent. Alternatively, the pigment or dye may be contained in the ink.

Examples of the method of adhering the solidification nucleus to the sheet surface include a method of transferring, applying, spraying, or the like a material containing a solidification nucleation component to the sheet surface. For example, a general printing method such as a foil transfer method using a hot stamp, a cold stamp, or the like, a printing method using various plates (gravure printing, flexographic printing, offset printing, silk printing, and the like), an inkjet method, a thermal transfer method using an ink ribbon, or the like can be used.

As an example of the transfer method using the alloy foil, there is a method in which an alloy foil containing a solidification nucleation component is bonded to a sheet surface, and a heated silicon roll is pressed against the alloy foil to transfer the alloy foil to the sheet surface.

As an example of a printing method using a plate, there is a method in which an ink or a surfactant containing a component serving as a solidification nucleus is adhered to a rubber roll or a rubber stamp on which a printing pattern is formed on a peripheral surface, and the rubber roll or the rubber stamp is pressed against a sheet surface to transfer the ink or the surfactant. According to this method, the solidification nucleation component can be efficiently adhered to the sheet surface with respect to the continuously passing steel sheet.

The adhesion amount of the solidification nuclei is preferably, for example, in a range of 50 mg/m$^2$ or more and 5000 mg/m$^2$ or less. When the adhesion amount is less than 50 mg/m$^2$, there is a possibility that the first region is not formed to an extent that can be identified with the naked eye, which is not preferable. On the other hand, when the adhesion amount is more than 5000 mg/m$^2$, adhesion of the hot-dip plated layer may be deteriorated, which is not preferable.

Next, the steel sheet having the pattern portion formed on the surface thereof is immersed in a hot-dip plating bath. The hot-dip plating bath contains 4 to 22 mass % of Al and 1.0 to 10 mass % of Mg with Zn and impurities as the remainder. Further, the hot-dip plating bath may contain 0.0001 to 2.0 mass % of Si. Furthermore, the hot-dip plating bath may contain any one or more of Ni, Ti, Zr, Sr, Fe, Sb, Pb, Sn, Ca, Co, Mn, P, B, Bi, Cr, Sc, Y, REM, Hf, and C in an amount of 0.0001 to 1 mass % in total.

The composition of the hot-dip plated layer can be measured by the following method. First, the surface layer coating film is removed with a coating film peeling agent (for example, NEOREVER SP-751 manufactured by Sansai Kako Co. Ltd.) that does not erode plating, then the hot-dip plated layer is melted with hydrochloric acid containing an inhibitor (for example, HIBIRON manufactured by Sugimura Chemical Industry Co., Ltd.), and the obtained solution is subjected to inductively coupled plasma (ICP) emission spectrometry, whereby the surface layer coating film can be obtained.

The temperature of the hot-dip plating bath is preferably in the range of 400 to 500° C. This is because a desired hot-dip plated layer can be formed when the temperature of the hot-dip plating bath is within this range.

The adhesion amount of the hot-dip plated layer may be adjusted by means such as gas wiping on the steel sheet pulled up from the hot-dip plating bath. The adhesion amount of the hot-dip plated layer is preferably adjusted such that the adhesion amount of both surfaces of the steel sheet falls within the range of 30 to 600 g/m$^2$ in total. When the adhesion amount is less than 30 g/m$^2$, corrosion resistance of the Zn—Al—Mg-based hot-dip plated steel sheet is deteriorated, which is not preferable. When the adhesion amount exceeds 600 g/m$^2$, molten metal adhering to the steel sheet drips, and the surface of the hot-dip plated layer cannot be smoothed, which is not preferable.

After adjusting the adhesion amount of the hot-dip plated layer, a reheating treatment is performed, and then the steel sheet is cooled. The reheating treatment is performed under the condition that the interface alloy layer of the pattern portion is 10 nm or more and the interface alloy layer of the non-pattern portion is 500 nm or less. Specific conditions of the reheating treatment vary depending on the plating composition, but for example, the surface temperature Tw of the plated layer in a molten state immediately after wiping may be retained for 1 to 10 seconds within a temperature range of (Tw+15)° C. to (Tw+50° C.) The cooling condition after the reheating treatment may be, for example, a condition of cooling at a cooling rate of 3° C./s or more and less than 30° C./s, preferably 3 to 25° C./s until the temperature reaches the range of 300 to 340° C. When the reheating temperature is extremely low or the reheating time is short, an interface alloy layer having a sufficient thickness cannot be formed in the pattern portion, and the adhesion of the hot-dip plated layer in the pattern portion is not improved. In addition, when the reheating temperature is extremely high or the reheating time is extremely long, Fe is excessively diffused into the hot-dip plated layer in the pattern portion, and accordingly, the alloying of the hot-dip plated layer proceeds, making it difficult for the design to be exhibited by the pattern portion.

Cooling of the molten metal adhered to the steel sheet is started after the steel sheet is pulled up from the hot-dip plating bath. Depending on the composition of the hot-dip plating bath, for example, the [Al phase] starts to crystallize from around 430° C. Subsequently, the [MgZn$_2$] starts to crystallize from around 370° C., the [Al/Zn/MgZn$_2$ ternary eutectic structure] crystallizes from around 340° C., and the solidification is completed.

At this time, in the region where the solidification nuclei adhere to the sheet surface, the [Al phase] starts to crystallize with the solidification nuclei as nuclei, and a large amount of [Al phase] crystallizes near the interface between the steel sheet and the molten metal. Since the [Al phase] is generated at a relatively high density by the solidification nuclei, the [Al phase] itself does not coarsen and remains fine. Therefore, the [Al phase] does not grow to the surface side of the hot-dip plated layer, and the exposure proportion of the [Al phase] is relatively small. In this manner, it is presumed that the region where the solidification nucleus exists on the sheet surface becomes the pattern portion of the hot-dip plated layer.

On the other hand, in the region where the solidification nucleus does not adhere to the sheet surface, the [Al phase] crystallizes in the entire thickness direction of the molten metal. That is, since the density at which the [Al phase] crystallizes is relatively low, the crystallization of the [Al phase] is not inhibited. As a result, the [Al phase] coarsens. Therefore, since the [Al phase] grows up to the surface side of the hot-dip plated layer, the exposure proportion of the [Al phase] on the surface of the hot-dip plated layer is relatively large.

By such a mechanism, it is presumed that a region where no solidification nucleus exists on the sheet surface becomes a non-pattern portion of the hot-dip plated layer.

When the chemical conversion treatment layer is formed on the surface of the hot-dip plated layer, the hot-dip plated steel sheet after the formation of the hot-dip plated layer is subjected to a chemical conversion treatment. The type of chemical conversion treatment is not particularly limited, and a known chemical conversion treatment can be used.

When a coating film layer is formed on the surface of the hot-dip plated layer or the surface of the chemical conversion treatment layer, coating treatment is performed on the hot-dip plated steel sheet after the hot-dip plated layer is formed or after the chemical conversion treatment layer is formed. The type of coating treatment is not particularly limited, and a known coating treatment can be used.

As an example of the chemical conversion treatment, chemical conversion treatment with a chemical conversion treatment agent containing a phthalocyanine pigment coated with at least one of a resin and a surfactant can be exemplified. As the chemical conversion treatment agent, specifically, an aqueous coating agent containing polyurethane resin particles having at least one of a silanol group and an alkoxysilyl group, ethylene-unsaturated carboxylic acid copolymer resin particles, silicon oxide particles, an organic titanium compound, and a phthalocyanine pigment, in which the content of the phthalocyanine pigment is 0.01 to 10 parts by mass with respect to 100 parts by mass of the total of the polyurethane resin particles and the ethylene-unsaturated carboxylic acid copolymer resin particles, and the phthalocyanine pigment has a primary particle diameter of 0.01 to 1.0 μm was used. The hot-dip plated layer subjected to the chemical conversion treatment can impart a preferable designability to the surface of the plated layer by being colored with a phthalocyanine pigment, and furthermore, corrosion resistance, weather resistance, and the like of the chemical conversion coating to be formed can be improved.

According to the present embodiment, it is possible to provide a hot-dip plated steel sheet having excellent corrosion resistance, high durability of a pattern portion in which characters and designs appear, and excellent adhesion of a hot-dip plated layer in the pattern portion.

In particular, in the present embodiment, by adhering the solidification nucleus to the sheet surface to form any pattern, the range of the pattern portion can be intentionally determined, and the pattern portion can be disposed to form a shape of any one of a straight line portion, a curve portion, a figure, a number, a symbol, and a character, or a combination of two or more thereof. As a result, various designs can be applied to the surface of the hot-dip plated layer without performing coating or grinding, and identifiability, designability, and the like of the steel sheet can be improved. By forming the interface alloy layer together with the element concentrated region in the pattern portion, the adhesion of the hot-dip plated layer in the pattern portion can be enhanced to the same extent as the adhesion of the hot-dip plated layer in the non-pattern portion.

According to the present embodiment, various designs, trademarks, and other identification marks can be displayed on the surface of the hot-dip plated layer without performing printing, painting, or grinding, and the identifiability of the source of the steel sheet, the designability, and the like can be improved. In addition, information necessary for process management, inventory management, and the like and any information required by the consumer can also be given to the hot-dip plated steel sheet by the pattern portion. This can also contribute to improvement in productivity of the hot-dip plated steel sheet.

EXAMPLES

Hereinafter, Examples of the present invention will be described.

(No.1 to 71)

First, the steel sheet after cold rolling was degreased and washed with water. An ink containing a solidification nucleation component shown in Table 1 was adhered to a rubber plate having a shape in which a grid pattern at intervals of 50 mm was transferred. Here, the base-stitch pattern was formed in a linear shape and had a line width of 10 mm. By pressing this rubber plate against the steel sheet after being washed with water, the ink containing the solidification nucleation component was adhered to the sheet surface in a grid pattern at intervals of 50 mm. Thereafter, cold-band annealing was performed on the steel sheet. The steel sheet after the cold-band annealing was immersed in a hot-dip plating bath at 400 to 500° C. to form a hot-dip plated layer on the sheet surface. Thereafter, the adhesion amount was controlled with a wiping nozzle, reheating treatment was performed, and cooling was further performed. In the reheating treatment, the wiped steel sheet was heated to a reheating temperature described in Tables 2A and 2B, retained at the reheating temperature, and cooled to a range of 300 to 340° C. at an average cooling rate described in Tables 2A and 2B. In this manner, Zn—Al—Mg-based hot-dip plated steel sheets Nos. 1 to 71 shown in Tables 3A to 4B were manufactured.

(No.72)

After controlling the adhesion amount of the plated layer with a wiping nozzle, and without reheating, the Zn—Al—Mg-based hot-dip plated steel sheet was manufactured in the same manner as described above, except for cooling. The results are shown in Tables 3B and 4B as No. 72.

(No.73)

A Zn—Al—Mg-based hot-dip plated steel sheet was manufactured in the same manner as described above except that the ink was not transferred with a rubber plate. Thereafter, a grid pattern at intervals of 50 mm was printed on the surface of the hot-dip plated layer by an inkjet method. The results are shown in Tables 3B and 4B as No. 73.

(No.74)

A Zn—Al—Mg-based hot-dip plated steel sheet was manufactured in the same manner as described above except that the ink was not transferred with a rubber plate. Thereafter, the surface of the hot-dip plated layer was ground to form a grid-like pattern at intervals of 50 mm. The results are shown in Tables 3B and 4B as No. 74.

[Method for Evaluating Exposure Proportion of [Al Phase]]

The surface of the hot-dip plated layer was photographed with a scanning electron microscope at a magnification of 100, and surface analysis for measuring element distribution was performed using an energy dispersive X-ray elemental analyzer (EDS) attached to the scanning electron microscope. Five images of 1 mm$^2$ visual field in which the pattern portion was photographed and five images of 1 mm$^2$ visual field in which the non-pattern portion was photographed were prepared. For each image, the area of the [Al phase] exposed on the surface of the hot-dip plated layer was measured using commercially available image analysis software. The [Al phase] was obtained by using both the Al-concentrated region in the surface analysis and the morphology observation of the [Al phase] by the reflected electron image. In each of the pattern portion and the non-pattern portion, the average value of the exposed areas of the [Al phase] in five images was obtained. Then, by dividing the average value of the exposed area of the [Al phase] by the total area of the observed visual field, the average exposed area fraction (%) of the [Al phase] in the observed visual field was obtained for each of the pattern portion and the non-pattern portion. The average exposed area fraction (%) of the [Al phase] obtained in this manner was taken as the exposure proportion of the [Al phase].

[Method for Measuring Arithmetic Mean Surface Roughness Sa]

Virtual lattice lines were drawn at intervals of 0.5 mm on the surface of the hot-dip plated layer, and the arithmetic mean surface roughness Sa of each region was measured in each of a plurality of regions partitioned by the virtual lattice lines. A region having the arithmetic mean surface roughness Sa of 1 µm or more was a non-pattern portion, and a region having the arithmetic mean surface roughness Sa of less than 1 µm was a pattern portion. The arithmetic mean surface roughness Sa was measured using a 3D laser microscope (manufactured by Keyence Corporation). In the present example, using a standard lens of 20 times, the height A in the region was measured at a measurement interval of 50 µm in each of a plurality of regions partitioned by virtual lattice lines. When the measurement was performed on the grid, 100 measurement points were obtained in the region. When 100 points of the obtained height A were defined as a height $Z_1$ to a height $Z_{100}$, Sa was calculated using the following formula. $A_{ave}$ was an average of 100 points of height A.

$$Sa = 1/100 \times \sum [x = 1 \rightarrow 100] (|\text{height } Z_x - Z_{ave}|)$$

Note that the location where the arithmetic mean surface roughness Sa was measured was different from the location where the exposure proportion of the Al phase was measured. The same applies to both the pattern portion and the non-pattern portion.

[Element Concentrated Region and Interface Alloy Layer]

A cross section of the hot-dip plated steel sheet in the sheet thickness direction was exposed, and an interface between the hot-dip plated layer appearing in the cross section and the steel sheet was subjected to surface analysis for measuring element distribution by an electron beam probe microanalyzer (EPMA) to confirm an element concentrated region and an interface alloy layer, and also to measure a concentration and a concentration ratio of element M. The thickness of the interface alloy layer was measured from a reflected electron image of a scanning electron microscope (SEM).

[Designability]

For the test plates according to Examples and Comparative Examples, whether or not the grid-like pattern was visually recognizable was evaluated based on the following criteria. The evaluation was performed immediately after manufacturing the test plate and in an aged state after being exposed outdoors for 6 months. A or B was regarded as acceptable in both the initial state and the aged state. When at least one of the initial state and the aged state was C, it was determined as fail.

A: The grid could be visually recognized even from 5 m ahead.

B: The grid could not be visually recognized from 5 m ahead, but the visibility from 2 m ahead was high.

C: The grid could not be visually recognized from 2 m ahead.

[Corrosion Resistance]

A test plate cut into 150×70 mm was subjected to a corrosion acceleration test CCT in accordance with JASO-M609 for 30 cycles. Thereafter, corrosion resistance was evaluated as follows based on the rust generation state. A or B was regarded as acceptable.

A: No rust was generated, and a beautiful design appearance was maintained.

B: The design appearance was slightly impaired due to generation of rust.

C: External appearance quality was significantly deteriorated due to generation of rust.

[Plating Adhesion]

A test plate cut into 150×70 mm was subjected to 2T bending at a part where a grid-like pattern was formed, and plating adhesion was evaluated based on the following criteria. A or B was regarded as acceptable.

A: The plating was not detached even when the tape was peeled off. B: The plating was detached when the tape was peeled off, but the plating was not detached unless the tape was peeled off. C: The plating was detached even when the tape was not peeled off.

As shown in Tables 2A to 4B, in Nos. 1 to 61, the manufacturing conditions satisfied the preferable conditions, the average composition of the hot-dip plated layer satisfied the invention range, a pattern portion and a non-pattern portion were formed in the hot-dip plated layer, an element concentrated region containing the element M and an interface alloy layer containing Fe and Al were present at the interface between the base steel sheet and the hot-dip plated layer in the pattern portion, the average concentration of the element M contained in the hot-dip plated layer and the element concentrated region was 0.0010 to 2 mass %, and in the element concentrated region, the element M was concentrated to 2 times or more the hot-dip plated layer present in the pattern portion, or the element M was unevenly distributed. As a result, Nos. 1 to 61 had excellent designability, corrosion resistance, and plating adhesion. In addition, Fe and Al were contained in the interface alloy layers of the pattern portion and the non-pattern portion of Nos. 1 to 61. When Si was contained in the plated layer, Fe, Al, and Si were contained in the interface alloy layer of the pattern portion and the non-pattern portion.

In No. 62, the Al content in the average composition of the bot-dip plated layer was insufficient. For this reason, corrosion resistance of the hot-dip plated layer was insufficient.

In No. 63, the Al content in the average composition of the hot-dip plated layer was excessive. For this reason, corrosion resistance of the hot-dip plated layer was insufficient.

In No. 64, the Mg content in the average composition of the hot-dip plated layer was insufficient. For this reason, corrosion resistance of the hot-dip plated layer was insufficient.

No. 65 had an excessive Mg content in the average composition of the hot-dip plated layer. For this reason, dross was generated in the plating bath, and corrosion resistance of the hot-dip plated layer was insufficient.

In No. 66, since the staying time in the reheating treatment exceeded a preferable upper limit, the element M added as a solidification nucleus was diffused inside the plated layer, and the plated layer was homogenized, resulting in deterioration of designability.

In No. 67, since the heating temperature in the reheating treatment was lower than the preferable lower limit, no interface alloy layer was formed in the pattern portion, and the adhesion was deteriorated.

In No. 68, since the staying time in the reheating treatment was lower than the preferable lower limit, no interface alloy layer was formed in the pattern portion, and the adhesion was deteriorated.

In No. 69, since the heating time in the reheating treatment exceeded the preferred upper limit, the M element added as a solidification nucleus was diffused inside the plated layer, and the adhesion was deteriorated.

In No. 70, since the average cooling rate in the reheating treatment was lower than a preferable lower limit, the element M added as a solidification nucleus was diffused inside the plated layer, and the plated layer was homogenized, resulting in deterioration of designability.

In No. 71, since the average cooling rate in the reheating treatment exceeded the preferred upper limit, the surface of the plated layer was roughened by spraying the cooling gas during cooling, and the designability was deteriorated.

In No. 72, since the reheating treatment was not performed, no interface alloy layer was formed in the pattern portion, and the adhesion was deteriorated.

In No. 73, since a pattern portion was formed by printing, designability was deteriorated with the lapse of time.

In No. 74, since the pattern portion was formed by grinding, the plating thickness in the pattern portion was reduced, and the corrosion resistance was reduced.

TABLE 1

| Symbol | Ink-containing components |
|---|---|
| A | Carbon |
| B | Nickel |
| C | Calcium |
| D | Boron |
| E | Phosphorus |
| F | Chromium |

TABLE 2A

| | Manufacturing method | | | | | |
|---|---|---|---|---|---|---|
| | | | Temperature during wiping | Reheating treatment | | Cooling Average |
| No. | Design application method | Ink-containing component | Tw (° C.) | Temperature (° C.) | Staying time (seconds) | cooling rate (° C./s) |
| 1 | Plating solidification | A | 340 | 370 | 6 | 3 |
| 2 | Plating solidification | F | 350 | 365 | 4 | 10 |
| 3 | Plating solidification | B | 410 | 450 | 4 | 10 |
| 4 | Plating solidification | F | 460 | 495 | 4 | 25 |
| 5 | Plating solidification | B | 480 | 530 | 4 | 20 |
| 6 | Plating solidification | D | 410 | 450 | 8 | 25 |
| 7 | Plating solidification | F | 430 | 450 | 4 | 25 |
| 8 | Plating solidification | E | 450 | 470 | 10 | 10 |
| 9 | Plating solidification | B | 400 | 445 | 2 | 5 |
| 10 | Plating solidification | E | 410 | 425 | 8 | 15 |
| 11 | Plating solidification | C | 420 | 435 | 6 | 20 |
| 12 | Plating solidification | A | 400 | 445 | 6 | 20 |
| 13 | Plating solidification | A | 400 | 415 | 2 | 5 |
| 14 | Plating solidification | B | 410 | 440 | 2 | 10 |
| 15 | Plating solidification | F | 410 | 445 | 8 | 25 |
| 16 | Plating solidification | F | 420 | 470 | 4 | 20 |
| 17 | Plating solidification | E | 400 | 440 | 10 | 5 |
| 18 | Plating solidification | C | 420 | 440 | 10 | 10 |
| 19 | Plating solidification | E | 410 | 425 | 6 | 15 |
| 20 | Plating solidification | F | 410 | 430 | 8 | 15 |
| 21 | Plating solidification | A | 420 | 440 | 4 | 15 |
| 22 | Plating solidification | D | 420 | 450 | 6 | 15 |
| 23 | Plating solidification | D | 400 | 445 | 2 | 25 |
| 24 | Plating solidification | C | 410 | 455 | 6 | 20 |
| 25 | Plating solidification | B | 420 | 455 | 10 | 15 |
| 26 | Plating solidification | F | 400 | 445 | 10 | 10 |
| 27 | Plating solidification | A | 410 | 435 | 4 | 15 |

TABLE 2A-continued

| No. | Design application method | Ink-containing component | Temperature during wiping Tw (° C.) | Reheating treatment Temperature (° C.) | Reheating treatment Staying time (seconds) | Cooling Average cooling rate (° C./s) |
|---|---|---|---|---|---|---|
| 28 | Plating solidification | E | 420 | 440 | 6 | 15 |
| 29 | Plating solidification | C | 400 | 440 | 8 | 15 |
| 30 | Plating solidification | E | 410 | 430 | 8 | 15 |
| 31 | Plating solidification | B | 420 | 455 | 1 | 15 |
| 32 | Plating solidification | A | 400 | 425 | 2 | 20 |
| 33 | Plating solidification | B | 420 | 445 | 4 | 20 |
| 34 | Plating solidification | A | 410 | 435 | 6 | 20 |
| 35 | Plating solidification | E | 410 | 440 | 3 | 10 |
| 36 | Plating solidification | B | 420 | 440 | 3 | 20 |
| 37 | Plating solidification | E | 420 | 445 | 6 | 20 |

TABLE 2B

| No. | Design application method | Ink-containing component | Temperature during wiping Tw (° C.) | Reheating treatment Temperature (° C.) | Reheating treatment Staying time (seconds) | Cooling Average cooling rate (° C./s) |
|---|---|---|---|---|---|---|
| 38 | Plating solidification | B | 400 | 425 | 7 | 15 |
| 39 | Plating solidification | F | 410 | 430 | 7 | 10 |
| 40 | Plating solidification | D | 420 | 440 | 3 | 15 |
| 41 | Plating solidification | D | 400 | 425 | 6 | 10 |
| 42 | Plating solidification | B | 410 | 430 | 8 | 10 |
| 43 | Plating solidification | B | 410 | 430 | 8 | 15 |
| 44 | Plating solidification | C | 400 | 420 | 6 | 20 |
| 45 | Plating solidification | C | 400 | 430 | 8 | 20 |
| 46 | Plating solidification | D | 420 | 445 | 5 | 15 |
| 47 | Plating solidification | A | 410 | 435 | 4 | 15 |
| 48 | Plating solidification | B | 400 | 425 | 8 | 15 |
| 49 | Plating solidification | E | 410 | 435 | 6 | 10 |
| 50 | Plating solidification | B | 420 | 440 | 4 | 20 |
| 51 | Plating solidification | C | 400 | 425 | 5 | 20 |
| 52 | Plating solidification | E | 410 | 430 | 5 | 20 |
| 53 | Plating solidification | E | 420 | 445 | 6 | 26 |
| 54 | Plating solidification | D | 410 | 430 | 7 | 15 |
| 55 | Plating solidification | F | 410 | 425 | 6 | 20 |
| 56 | Plating solidification | B | 410 | 425 | 8 | 5 |

TABLE 2B-continued

| | Manufacturing method | | | | |
|---|---|---|---|---|---|
| | Design | Ink-containing | Temperature during wiping Tw | Reheating treatment | | Cooling Average cooling rate |
| No. | application method | component | (° C.) | Temperature (° C.) | Staying time (seconds) | (° C./s) |
| 57 | Plating solidification | C | 400 | 435 | 5 | 15 |
| 58 | Plating solidification | F | 410 | 455 | 10 | 10 |
| 59 | Plating solidification | B | 420 | 465 | 2 | 5 |
| 60 | Plating solidification | C | 410 | 435 | 10 | 25 |
| 61 | Plating solidification | E | 400 | 420 | 8 | 15 |
| 62 | Plating solidification | A | 340 | 360 | 5 | 15 |
| 63 | Plating solidification | B | 530 | 550 | 3 | 25 |
| 64 | Plating solidification | D | 430 | 455 | 5 | 15 |
| 65 | Plating solidification | A | 450 | 480 | 3 | 10 |
| 66 | Plating solidification | A | 400 | 445 | <u>11</u> | 5 |
| 67 | Plating solidification | B | 410 | <u>420</u> | 8 | 10 |
| 68 | Plating solidification | C | 420 | 440 | <u>Less than 1 second</u> | 10 |
| 69 | Plating solidification | C | 410 | <u>465</u> | 5 | 15 |
| 70 | Plating solidification | F | 410 | 435 | 10 | <u>2</u> |
| 71 | Plating solidification | E | 420 | 450 | 5 | <u>30</u> |
| 72 | Plating solidification | C | 420 | <u>No reheating</u> | | 10 |
| 73 | Printing after plating | None | 410 | <u>No reheating</u> | | 10 |
| 74 | Grinding after plating | None | 420 | <u>No reheating</u> | | 10 |

The underlined sections indicate that it is outside the range of preferred manufacturing conditions.

TABLE 3A

| | Hot-dip plated layer | | | | | | | |
|---|---|---|---|---|---|---|---|---|
| | | | | | | Pattern portion | | Non-pattern portion | |
| | Average composition (mass %) Remainder: Zn and impurities | | | | Adhesion amount | Al phase | Arithmetic mean surface roughness Sa | Al phase | Arithmetic mean surface roughness Sa |
| No. | Al | Mg | Si | Others | (g/m²) | (area %) | (μm) | (area %) | (μm) |
| 1 | 4 | 3.0 | — | — | 150 | 30 | 0.4 | 50 | 1.4 |
| 2 | 6 | 3.0 | 0.2 | — | 140 | 20 | 0.6 | 45 | 1.6 |
| 3 | 11 | 3.0 | 0.2 | — | 140 | 25 | 0.6 | 50 | 1.8 |
| 4 | 18 | 5.0 | 0.2 | — | 150 | 30 | 0.8 | 40 | 1.2 |
| 5 | 22 | 8.0 | 0.2 | — | 160 | 10 | 0.4 | 50 | 1.2 |
| 6 | 11 | 1.0 | 0.2 | — | 150 | 25 | 0.4 | 55 | 1.8 |
| 7 | 11 | 7.0 | 0.2 | — | 140 | 5 | 0.4 | 40 | 1.8 |
| 8 | 11 | 10 | 0.2 | — | 150 | 10 | 0.4 | 60 | 1.8 |
| 9 | 11 | 3.0 | — | — | 160 | 5 | 0.6 | 40 | 1.8 |
| 10 | 11 | 3.0 | 0.0001 | — | 150 | 15 | 0.8 | 55 | 1.8 |
| 11 | 11 | 3.0 | 2 | — | 160 | 15 | 0.8 | 45 | 1.4 |
| 12 | 11 | 3.0 | 0.2 | Ni 0.01% | 150 | 15 | 0.6 | 40 | 1.4 |
| 13 | 11 | 3.0 | 0.2 | Ti 0.01% | 140 | 5 | 0.8 | 40 | 1.4 |
| 14 | 11 | 3.0 | 0.2 | Zr 0.01% | 150 | 5 | 0.6 | 55 | 1.2 |
| 15 | 11 | 3.0 | 0.2 | Ni 0.01% | 150 | 10 | 0.8 | 60 | 1.2 |
| 16 | 11 | 3.0 | 0.2 | Sr 0.01% | 140 | 5 | 0.4 | 50 | 1.6 |
| 17 | 11 | 3.0 | 0.2 | Fe 0.01% | 150 | 30 | 0.4 | 45 | 1.8 |
| 18 | 11 | 3.0 | 0.2 | Sb 0.01% | 150 | 15 | 0.6 | 55 | 2.0 |

TABLE 3A-continued

| | Hot-dip plated layer | | | | | | | |
|---|---|---|---|---|---|---|---|---|
| | Average composition (mass %) Remainder: Zn and impurities | | | | Adhesion amount | Pattern portion | | Non-pattern portion | |
| | | | | | | Al phase | Arithmetic mean surface roughness Sa | Al phase | Arithmetic mean surface roughness Sa |
| No. | Al | Mg | Si | Others | (g/m²) | (area %) | (μm) | (area %) | (μm) |
| 19 | 11 | 3.0 | 0.2 | Pb 0.01 % | 160 | 10 | 1.0 | 40 | 1.4 |
| 20 | 11 | 3.0 | 0.2 | Sn 0.01% | 150 | 15 | 0.8 | 60 | 1.2 |
| 21 | 11 | 3.0 | 0.2 | Ca 0.01% | 140 | 25 | 0.4 | 45 | 1.6 |
| 22 | 11 | 3.0 | 0.2 | Co 0.01% | 140 | 20 | 0.6 | 45 | 1.8 |
| 23 | 11 | 3.0 | 0.2 | Mn 0.01% | 150 | 20 | 0.4 | 40 | 1.8 |
| 24 | 11 | 3.0 | 0.2 | P 0.01% | 160 | 15 | 0.6 | 40 | 1.2 |
| 25 | 11 | 3.0 | 0.2 | B 0.01% | 150 | 20 | 0.6 | 40 | 1.4 |
| 26 | 11 | 3.0 | 0.2 | Bi 0.01% | 160 | 25 | 0.6 | 60 | 1.2 |
| 27 | 11 | 3.0 | 0.2 | Cr 0.01% | 150 | 25 | 0.4 | 60 | 1.4 |
| 28 | 11 | 3.0 | 0.2 | Sc 0.01% | 160 | 5 | 0.6 | 55 | 1.6 |
| 29 | 11 | 3.0 | 0.2 | Y 0.01% | 140 | 30 | 0.4 | 40 | 1.8 |
| 30 | 11 | 3.0 | 0.2 | REM 0.01% | 150 | 30 | 0.4 | 40 | 1.4 |
| 31 | 11 | 3.0 | 0.2 | Hf 0.01% | 150 | 25 | 0.8 | 40 | 1.4 |
| 32 | 11 | 3.0 | 0.2 | C 0.01% | 140 | 5 | 0.8 | 40 | 1.4 |
| 33 | 11 | 3.0 | — | Ni 0.01% | 140 | 20 | 0.4 | 60 | 1.6 |
| 34 | 11 | 3.0 | — | Ti 0.01% | 150 | 30 | 0.6 | 55 | 1.2 |
| 35 | 11 | 3.0 | — | Zr 0.01% | 140 | 25 | 0.4 | 50 | 1.8 |
| 36 | 11 | 3.0 | — | Ni 0.01% | 150 | 10 | 0.4 | 60 | 1.6 |
| 37 | 11 | 3.0 | — | Sr 0.01% | 140 | 15 | 0.4 | 55 | 1.4 |

TABLE 3B

| | Hot-dip plated layer | | | | | | | |
|---|---|---|---|---|---|---|---|---|
| | Average composition (mass %) Remainder: Zn and impurities | | | | Adhesion amount | Pattern portion | | Non-pattern portion | |
| | | | | | | Al phase | Arithmetic mean surface roughness Sa | Al phase | Arithmetic mean surface roughness Sa |
| No. | Al | Mg | Si | Others | (g/m²) | (area %) | (μm) | (area %) | (μm) |
| 38 | 11 | 3.0 | — | Fe 0.01% | 160 | 10 | 0.6 | 60 | 1.2 |
| 39 | 11 | 3.0 | — | Sb 0.01% | 150 | 30 | 0.4 | 50 | 1.2 |
| 40 | 11 | 3.0 | — | Pb 0.01% | 160 | 30 | 0.4 | 60 | 1.2 |
| 41 | 11 | 3.0 | — | Sn 0.01% | 150 | 10 | 0.6 | 50 | 1.4 |
| 42 | 11 | 3.0 | — | Ca 0.01% | 150 | 30 | 0.8 | 40 | 1.8 |
| 43 | 11 | 3.0 | — | Co 0.01% | 160 | 20 | 0.4 | 55 | 1.8 |
| 44 | 11 | 3.0 | — | Mn 0.01% | 150 | 25 | 0.4 | 45 | 1.2 |
| 45 | 11 | 3.0 | — | P 0.01% | 140 | 30 | 0.6 | 40 | 1.2 |
| 46 | 11 | 3.0 | — | B 0.01% | 140 | 30 | 0.4 | 55 | 1.2 |
| 47 | 11 | 3.0 | — | Bi 0.01% | 150 | 10 | 0.6 | 50 | 1.6 |
| 48 | 11 | 3.0 | — | Cr 0.01% | 150 | 15 | 0.4 | 45 | 1.2 |
| 49 | 11 | 3.0 | — | Sc 0.01% | 160 | 25 | 0.8 | 45 | 1.4 |
| 50 | 11 | 3.0 | — | Y 0.01% | 140 | 15 | 0.4 | 45 | 1.2 |
| 51 | 11 | 3.0 | — | REM 0.01% | 160 | 10 | 0.6 | 40 | 1.4 |
| 52 | 11 | 3.0 | — | Hf 0.01% | 150 | 15 | 0.6 | 50 | 1.6 |
| 53 | 11 | 3.0 | — | C 0.01% | 160 | 25 | 0.4 | 60 | 1.6 |
| 54 | 11 | 3.0 | — | B 0.01% + Ca0.01% | 150 | 15 | 0.4 | 45 | 1.4 |
| 55 | 11 | 3.0 | 0.2 | — | 30 | 5 | 0.8 | 60 | 1.2 |
| 56 | 11 | 3.0 | 0.2 | — | 600 | 10 | 0.8 | 40 | 1.8 |
| 57 | 11 | 3.0 | 0.2 | — | 150 | 10 | 0.6 | 55 | 1.4 |
| 58 | 11 | 3.0 | 0.2 | — | 140 | 5 | 0.8 | 60 | 1.4 |
| 59 | 11 | 3.0 | 0.2 | — | 150 | 30 | 0.4 | 55 | 1.8 |
| 60 | 11 | 3.0 | 0.2 | — | 150 | 30 | 0.8 | 45 | 1.2 |
| 61 | 11 | 3.0 | 0.2 | — | 160 | 20 | 0.4 | 55 | 1.4 |
| 62 | $\underline{3}$ | 3.0 | — | — | 140 | 25 | 0.6 | 50 | 1.2 |
| 63 | $\underline{23}$ | 3.0 | 0.2 | — | 150 | 15 | 0.8 | 40 | 1.2 |
| 64 | 11 | $\underline{0.5}$ | 0.2 | — | 140 | 20 | 0.4 | 45 | 1.4 |
| 65 | 11 | $\underline{11}$ | 0.2 | — | 160 | 25 | 0.6 | 55 | 1.8 |
| 66 | 11 | 3.0 | 0.2 | — | 140 | 10 | 0.6 | 40 | 1.6 |
| 67 | 11 | 3.0 | 0.2 | — | 150 | 5 | 0.4 | 45 | 1.4 |
| 68 | 11 | 3.0 | 0.2 | — | 150 | 25 | 0.8 | 60 | 1.6 |

TABLE 3B-continued

| | | | | | Hot-dip plated layer | | | | |
| | | | | | | Pattern portion | | Non-pattern portion | |
| | Average composition (mass %) Remainder: Zn and impurities | | | | Adhesion amount | Al phase | Arithmetic mean surface roughness Sa | Al phase | Arithmetic mean surface roughness Sa |
| No. | Al | Mg | Si | Others | (g/m²) | (area %) | (μm) | (area %) | (μm) |
| --- | --- | --- | --- | --- | --- | --- | --- | --- | --- |
| 69 | 11 | 3.0 | — | — | 140 | 20 | 0.6 | 55 | 1.6 |
| 70 | 11 | 3.0 | 0.2 | — | 140 | 15 | 0.8 | 45 | 1.4 |
| 71 | 11 | 3.0 | 0.2 | — | 140 | 15 | 0.4 | 50 | 1.8 |
| 72 | 11 | 3.0 | 0.2 | — | 150 | 25 | 0.6 | 55 | 1.2 |
| 73 | 11 | 3.0 | 0.2 | — | 130 | — | — | — | — |
| 74 | 11 | 3.0 | 0.2 | — | 140 | — | — | — | — |

The underlined sections indicate that it is outside the range of the present invention.

TABLE 4A

| | Element concentrated region | | | | Interface alloy layer | | | | | | |
| | | | | | Thickness | Thickness | Evaluation | | | | |
| | Detected element | Concentration of element M (*1) | Concentration ratio (*2) | Concentration ratio (*3) | in pattern portion | in non-pattern portion | Designability | | Corrosion | Plating | |
| No. | M | (mass %) | | | (nm) | (nm) | Initial state | Aged state | resistance | adhesion | Remarks |
| --- | --- | --- | --- | --- | --- | --- | --- | --- | --- | --- | --- |
| 1 | C | 0.1 | 7 | 9 | 40 | 55 | A | A | B | B | Invention |
| 2 | Cr | 0.8 | 7 | 10 | 50 | 65 | A | A | A | A | Examples |
| 3 | Ni | 0.7 | 9 | 8 | 40 | 40 | A | A | A | A | |
| 4 | Cr | 0.2 | 10 | 9 | 50 | 50 | A | A | A | A | |
| 5 | Ni | 0.2 | 10 | 5 | 500 | 500 | A | A | B | A | |
| 6 | B | 0.3 | 8 | 6 | 35 | 35 | A | A | B | A | |
| 7 | Cr | 0.5 | 3 | 9 | 60 | 70 | A | A | A | A | |
| 8 | P | 0.3 | 9 | 9 | 40 | 45 | A | A | B | A | |
| 9 | Ni | 0.1 | 10 | 8 | 70 | 80 | A | A | A | B | |
| 10 | P | 0.8 | 3 | 5 | 50 | 65 | A | A | A | A | |
| 11 | Ca | 0.2 | 10 | 5 | 30 | 40 | A | A | A | A | |
| 12 | C, Ni | 0.5 | 7 | 8 | 35 | 40 | A | A | A | A | |
| 13 | C, Ti | 0.3 | 7 | 6 | 35 | 45 | A | A | A | A | |
| 14 | Ni, Zr | 0.5 | 8 | 5 | 40 | 55 | A | A | A | A | |
| 15 | Cr, Ni | 0.6 | 8 | 6 | 35 | 40 | A | A | A | A | |
| 16 | Cr, Sr | 0.3 | 7 | 7 | 60 | 75 | A | A | A | A | |
| 17 | P, Fe | 0.5 | 6 | 8 | 45 | 45 | A | A | A | A | |
| 18 | Ca, Sb | 0.2 | 8 | 10 | 50 | 55 | A | A | A | A | |
| 19 | P, Pb | 0.6 | 6 | 9 | 45 | 45 | A | A | A | A | |
| 20 | Cr, Sn | 0.7 | 10 | 7 | 55 | 60 | A | A | A | A | |
| 21 | C, Ca | 0.5 | 4 | 5 | 45 | 55 | A | A | A | A | |
| 22 | B, Co | 0.8 | 8 | 5 | 40 | 45 | A | A | A | A | |
| 23 | B, Mn | 0.5 | 3 | 6 | 60 | 70 | A | A | A | A | |
| 24 | Ca, P | 0.6 | 5 | 9 | 60 | 75 | A | A | A | A | |
| 25 | Ni, B | 0.2 | 10 | 5 | 50 | 50 | A | A | A | A | |
| 26 | Cr, Bi | 0.7 | 5 | 10 | 55 | 65 | A | A | A | A | |
| 27 | C, Cr | 0.7 | 9 | 9 | 60 | 75 | A | A | A | A | |
| 28 | P, Sc | 0.1 | 8 | 10 | 50 | 65 | A | A | A | A | |
| 29 | Ca, Y | 0.8 | 6 | 9 | 50 | 50 | A | A | A | A | |
| 30 | P, REM | 0.7 | 7 | 10 | 50 | 50 | A | A | A | A | |
| 31 | Ni, Hf | 0.2 | 3 | 10 | 10 | 15 | A | A | A | B | |
| 32 | C | 0.3 | 8 | 5 | 35 | 40 | A | A | A | A | |
| 33 | Ni | 0.3 | 5 | 5 | 40 | 55 | A | A | A | A | |
| 34 | C, Ti | 0.8 | 6 | 6 | 40 | 50 | A | A | A | A | |
| 35 | P, Zr | 0.5 | 7 | 5 | 60 | 75 | A | A | A | A | |
| 36 | Ni | 0.4 | 7 | 6 | 55 | 65 | A | A | A | A | |
| 37 | P, Sr | 0.8 | 6 | 8 | 45 | 50 | A | A | A | A | |

(*1) The average concentration of element M contained in the hot-dip plated layer and the element concentrated region of the pattern portion.
(*2) The concentration ratio of element M with respect to the hot-dip plated layer of the pattern portion.
(*3) The concentration ratio of element group M at the interface of the pattern portion to that at the interface of the non-pattern portion.

TABLE 4B

| | | Element concentrated region | | | Interface alloy layer | | Evaluation | | | | |
|---|---|---|---|---|---|---|---|---|---|---|---|
| | | Concentration of element M (*1) (mass %) | Concentration ratio (*2) | Concentration ratio (*3) | Thickness in pattern portion (nm) | Thickness in non-pattern portion (nm) | Designability | | Corrosion resistance | Plating adhesion | Remarks |
| No. | Detected element M | | | | | | Initial state | Aged state | | | |
| 38 | Ni, Fe | 0.7 | 7 | 5 | 50 | 65 | A | A | A | A | Invention Examples |
| 39 | Cr, Sb | 0.4 | 8 | 5 | 30 | 45 | A | A | A | A | |
| 40 | B, Pb | 0.3 | 7 | 5 | 50 | 65 | A | A | A | A | |
| 41 | B, Sn | 0.8 | 7 | 8 | 40 | 55 | A | A | A | A | |
| 42 | P, Ca | 0.5 | 7 | 5 | 40 | 50 | A | A | A | A | |
| 43 | Ni, Co | 0.4 | 7 | 8 | 40 | 50 | A | A | A | A | |
| 44 | Ca, Mn | 0.5 | 5 | 7 | 50 | 55 | A | A | A | A | |
| 45 | Ca, P | 0.8 | 5 | 6 | 60 | 65 | A | A | A | A | |
| 46 | B | 0.8 | 7 | 7 | 55 | 70 | A | A | A | A | |
| 47 | C, Bi | 0.6 | 6 | 5 | 45 | 55 | A | A | A | A | |
| 48 | Ni, Cr | 0.4 | 5 | 6 | 45 | 50 | A | A | A | A | |
| 49 | P, Sc | 0.5 | 6 | 5 | 50 | 65 | A | A | A | A | |
| 50 | Ni, Y | 0.6 | 9 | 6 | 35 | 45 | A | A | A | A | |
| 51 | Ca, REM | 0.3 | 6 | 7 | 45 | 50 | A | A | A | A | |
| 52 | P, Hf | 0.8 | 9 | 5 | 50 | 60 | A | A | A | A | |
| 53 | P, C | 0.3 | 7 | 7 | 55 | 70 | A | A | A | A | |
| 54 | B, Ca | 0.4 | 7 | 8 | 45 | 55 | A | A | A | A | |
| 55 | Cr | 0.8 | 6 | 7 | 55 | 60 | A | A | B | A | |
| 56 | Ni | 0.5 | 3 | 7 | 55 | 55 | A | A | A | A | |
| 57 | Ca | 0.6 | Unevenly distributed | 9 | 50 | 55 | A | A | A | A | |
| 58 | Cr | 0.010 | 2 | 8 | 50 | 50 | B | B | A | A | |
| 59 | Ni | 0.5 | 3 | 1.5 | 60 | 70 | B | B | A | A | |
| 60 | Ca | 0.6 | 8 | 2 | 60 | 60 | A | B | A | A | |
| 61 | P | 0.5 | 5 | 4 | 60 | 70 | A | A | A | A | |
| 62 | C | 0.3 | 5 | 5 | 40 | 40 | A | A | C | A | Comparative Examples |
| 63 | Ni | 0.3 | 3 | 3 | 50 | 55 | A | A | C | A | |
| 64 | B | 0.8 | 4 | 8 | 45 | 45 | A | A | C | A | |
| 65 | C | 0.6 | 8 | 6 | 50 | 55 | A | A | C | A | |
| 66 | C | 0.0005 | 3 | 2 | 80 | 80 | C | C | A | A | |
| 67 | N | 0.5 | 3 | 3 | None | 50 | A | A | A | C | |
| 68 | Ca | 0.4 | 2 | 3 | None | 35 | A | A | A | C | |
| 69 | Ca | 0.0008 | 3 | 4 | 600 | 600 | A | A | A | C | |
| 70 | Cr | 0.6 | 1.4 | 1.0 | 55 | 60 | C | C | A | A | |
| 71 | P | 0.5 | 1.3 | 3 | 40 | 45 | C | C | A | A | |
| 72 | Ca | 0.4 | 5 | 2 | None | 35 | A | A | A | C | |
| 73 | — | — | — | — | 50 | 50 | A | C | A | A | |
| 74 | — | — | — | — | 45 | 45 | A | B | C | A | |

The underlined sections indicate that it is outside the range of the present invention.
(*1) The average concentration of element M contained in the hot-dip plated layer and the element concentrated region of the pattern portion.
(*2) The concentration ratio of element M to the hot-dip plated layer of the pattern portion.
(*3) The concentration ratio of element group M at the interface of the pattern portion to that at the interface of the non-pattern portion.

Further, a chemical conversion treatment film was formed on the surface of the hot-dip plated steel sheet of Nos. 57 to 59 to confirm designability. The chemical conversion treatment film was formed by performing a chemical conversion treatment with a chemical conversion treatment agent containing a phthalocyanine pigment. As the chemical conversion treatment agent, an aqueous coating agent containing polyurethane resin particles having a silanol group and an alkoxysilyl group, ethylene-unsaturated carboxylic acid copolymer resin particles, silicon oxide particles, an organic titanium compound, and Cu phthalocyanine, in which the content of the Cu phthalocyanine pigment was 0.01 to 10 parts by mass with respect to 100 parts by mass of the total of the polyurethane resin particles and the ethylene-unsaturated carboxylic acid copolymer resin particles, and the Cu phthalocyanine had a primary particle diameter of 0.01 to 1.0 μm was used.

The hot-dip plated steel sheet of Nos. 57 to 59 on which the chemical conversion treatment film had been formed was evaluated for designability. As a result, the hot-dip plated steel sheet immediately after manufacturing the test plate and in an aged state after being exposed outdoors for 6 months were both evaluated as A, and the chemical conversion treatment film containing Cu phthalocyanine was provided, whereby the designability was further improved.

REFERENCE SIGNS LIST

1 Pattern portion
2 Non-pattern portion
3 Steel sheet
4 Hot-dip plated layer
5 Interface alloy layer
6 Element concentrated region

The invention claimed is:
1. A hot-dip plated steel sheet, comprising:
a steel sheet having first and second surfaces on respective opposite sides of the steel sheet, and a hot-dip plated layer formed on at least the first surface of the steel sheet, wherein
the hot-dip plated layer, in terms of average composition, contains 4 to 22 mass % of Al and 1.0 to 10 mass % of Mg with a remainder including Zn and impurities, the hot-dip plated layer includes a pattern portion and a non-pattern portion, an element concentrated region containing one or more elements M of Sb, Pb, Sn, Ca, Co, Mn, P, B, Bi, Cr, Sc, Y, Ni, Ti, Zr, Mo, W, REM, Hf, and C, and an interface alloy layer containing Fe and Al are present at an interface between the steel sheet and the hot-dip plated layer in the pattern portion, an average concentration of each of the one or more elements M contained in the hot-dip plated layer present in the pattern portion and each of the one or more elements M contained in the element concentrated region is individually 0.0010 to 2 mass %, and wherein either:
- each of the one or more elements M contained in the element concentrated region has a concentration, on a mass basis, of two or more times the respective concentration of each of the one or more elements M that is present, on a mass basis, in the hot-dip plated layer present in the pattern portion, or
- each of the one or more elements M is unevenly distributed such that each of the one or more elements M is present in the element concentrated region and each of the one or more elements M is not detected from the pattern portion other than the element concentrated region.

2. The hot-dip plated steel sheet according to claim 1, wherein the interface alloy layer containing Fe and Al is present at an interface between the steel sheet of the non-pattern portion and the hot-dip plated layer.

3. The hot-dip plated steel sheet according to claim 1, wherein the concentration of each of the one or more elements M at the interface between the steel sheet of the pattern portion and the hot-dip plated layer is, on a mass basis, 1.5 times or more the concentration of each of the one or more elements M at an interface between the steel sheet of the non-pattern portion and the hot-dip plated layer.

4. The hot-dip plated steel sheet according to claim 1, wherein the pattern portion is disposed to have a predetermined shape selected from the group consisting of a straight line portion, wherein the straight line portion has a length of 1 mm or more, a curve portion, wherein the curve portion has a length of 1 mm or more, a dot portion, wherein the dot portion has a circle equivalent diameter of 1 mm or more and less than 10 mm, or a combination of two or more thereof.

5. The hot-dip plated steel sheet according to claim 1, wherein the hot-dip plated layer further, in terms of average composition, contains 0.0001 to 2 mass % of Si.

6. The hot-dip plated steel sheet according to claim 5, wherein the interface alloy layer formed in the pattern portion further contains Si.

7. The hot-dip plated steel sheet according to claim 5, wherein the interface alloy layer containing Fe and Al is present at an interface between the steel sheet of the non-pattern portion and the hot-dip plated layer, and wherein the interface alloy layer formed at the interface between the steel sheet of the non-pattern portion and the hot-dip plated layer further contains Si.

8. The hot-dip plated steel sheet according to claim 1, wherein the hot-dip plated layer excluding the element concentrated region, in terms of average composition, further contains 0.0001 to 1 mass % in total of any one or more of Ni, Ti, Zr, Sr, Fe, Sb, Pb, Sn, Ca, Co, Mn, P, B, Bi, Cr, Sc, Y, REM, Hf, and C.

9. The hot-dip plated steel sheet according to claim 1, wherein the hot-dip plated layer is formed on both the first and the second surfaces, and wherein an adhesion amount is provided such that the total adhesion amount on both the first and the second surfaces is within the range of 30 to 600 g/m$^2$.

* * * * *